H. GOLDSCHMIDT.

PROCESS OF WELDING METALS.

APPLICATION FILED MAY 7, 1906.

Reissued Aug. 17, 1909.

13,010.

2 SHEETS—SHEET 1.

Witnesses
Chas. F. Clagett
Mary E. Stanton

Inventor
Hans Goldschmidt
By his Attorney
Chas. H. Dann

H. GOLDSCHMIDT.
PROCESS OF WELDING METALS.
APPLICATION FILED MAY 7, 1906.
Reissued Aug. 17, 1909.
13,010.
2 SHEETS—SHEET 2.
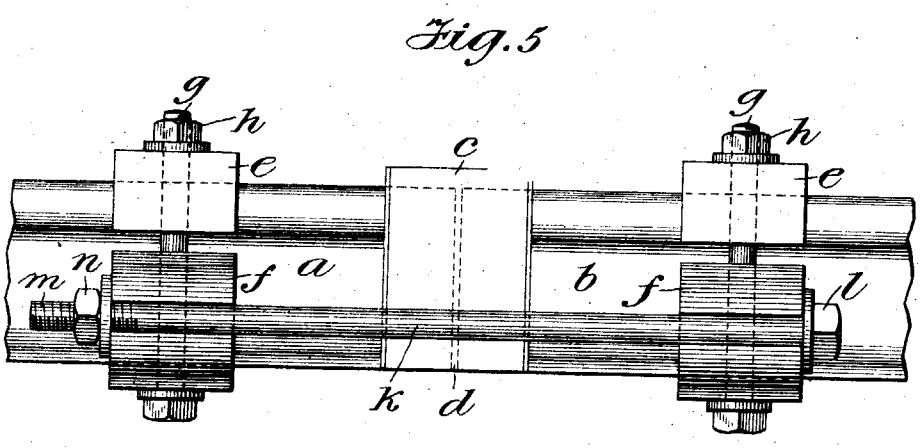
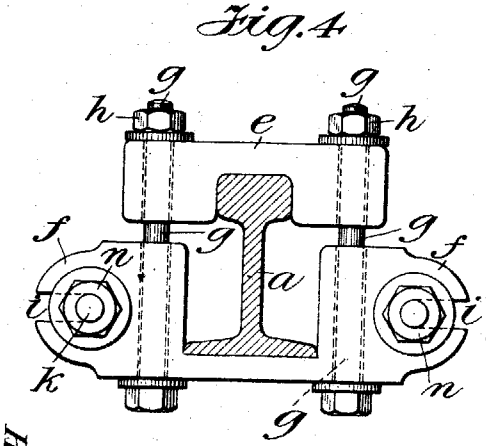
Witnesses.
Chas. F. Clagett
Mary E. Stanton
Inventor
Hans Goldschmidt
By his Attorney
Chas. H. Dane

UNITED STATES PATENT OFFICE.

HANS GOLDSCHMIDT, OF ESSEN-ON-THE-RUHR, GERMANY, ASSIGNOR, BY MESNE ASSIGNMENTS, TO GOLDSCHMIDT THERMIT CO., OF NEW YORK, N. Y., A CORPORATION OF NEW YORK.

PROCESS OF WELDING METALS.

No. 13,010. Specification of Reissued Letters Patent. Reissued Aug. 17, 1909.

Original No. 729,573, dated June 2, 1903, Serial No. 38,583. Application for reissue filed May 7, 1906. Serial No. 315,687.

*To all whom it may concern:*

Be it known that I, HANS GOLDSCHMIDT, a subject of the King of Prussia, German Emperor, and a resident of Essen-on-the-Ruhr, in the Province of the Rhine, German Empire, have invented a new and Improved Process of Welding Metals, of which the following is an exact specification.

The present invention relates to a process for welding metal pieces, particularly iron or steel pieces.

The process is based upon the knowledge that whereas under ordinary circumstances molten iron cannot be cast upon iron surfaces so as to stick at once fast the problem is solved when the metal is used in a highly-heated state, in which it results from the oxid by the use of aluminium, as shown by my former United States Letters Patent No. 578,868. The effect of the process can be explained thus: that in consequence of the highly-heated iron the adjacent parts of the iron pieces to be joined with the metal added by casting become quickly heated to the welding temperature and adopt the capacity of becoming joined with the metal cast upon them.

The process can be used for different purposes. It can serve for repairing damaged or defective cast or rolled iron pieces, whereby lacking parts may be easily renewed or two parts which in an undesired or defective manner are separated from each other can be again rejoined. The process may also ordinarily be used for joining two metal pieces by means of the highly-heated metal cast upon them. In any case it is an essential feature that the metal added, owing to its highly heated state due to the alumino-thermal reaction, be in condition to constitute both a connecting material and a means for applying heat to bring about welding of the parts with which it comes in contact.

In order to make my invention more clear, I refer to the accompanying drawings, in which similar letters denote similar parts, and in which—

Figure 1:
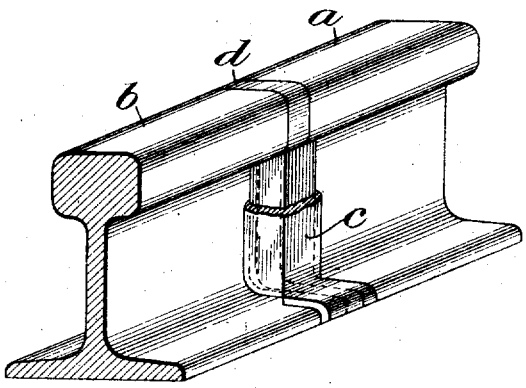
Figure 2:
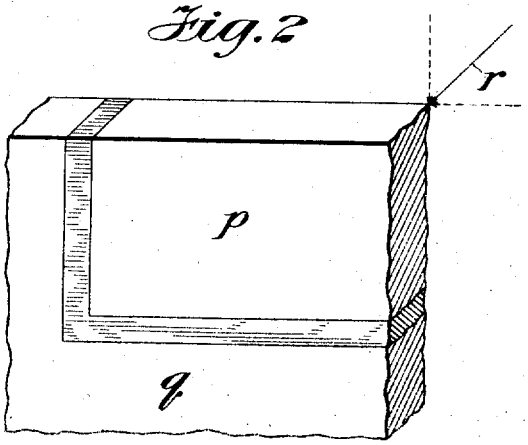
Figure 3:
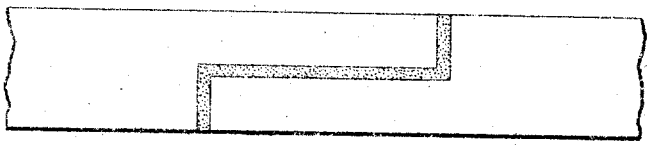

Figure 1 shows a perspective view of two rails to be welded, the welding-surfaces being level. Fig. 2 is a similar view of a modified form of welding; and Fig. 3 shows an elevation of two rails to be welded, the welding-surfaces overlapping each other. Fig. 4 is a vertical section of a rail, showing the arrangement of the clamping device for pressing the rails to be welded together. Fig. 5 is a side view of the device shown in Fig. 4.

Fig. 1 relates to a welding of two rails in which the process is carried out in such a manner that between the surfaces of both metal pieces to be welded highly-heated molten metal produced according to the alumina-thermo process is cast. The temperature of the added metal is so high that the extremities of both pieces to be welded adopt a temperature at which they become soft, and thus pass into a state in which they are apt of being joined. In order to accelerate the establishment of this state, the extremities of the metal pieces may previously be heated.

The employment of the alumina-thermo process for the production of the highly-heated iron has the advantage that the temperature of the metal to be produced, its chemical purity, and composition can easily be ascertained, which is not possible to such an extent with other heating processes, and has the further advantage that a metal can be produced the temperature of which is far beyond the melting-point of the iron without the risk of changing this iron with regard to its purity and the oxidation of the same.

The process is carried out in the following manner: The two rails to be joined are placed in a certain distance to each other after the joint-surfaces have been carefully cleaned or, if possible, rendered rough or grooved, and the joint-surface has been surrounded by a suitable mold into which the highly-heated iron is cast.

In Fig. 1, *a* and *b* illustrate the rails. *c* is a suitable mold, and *d* the joint.

The welding may also be accelerated by compressing the metal cast between the two rails, which is obtained by means of a suitable clamping apparatus, the construction of which is shown in Figs. 4 and 5 of the drawings. The apparatus consists of two clamping-jaws which are connected by means of a connecting-rod. The jaws consist of two pieces *e* and *f*, which are connected to each other by means of the screws *g*. The pieces *e* and *f* are provided with grooves into which the rail fits, as may be seen from Fig. 4. By screwing the nuts *h* of the screws *g* down the rail is perfectly fixed between the pieces *e* and *f*. Near the joined surface of each of the rails *a* and *b* to be joined one of the clamps so formed is fixed. On both sides of the lower piece *f* slots *i* are provided, in which slots a bar *k*, provided with a fixed head *l* on one side, and with screw-threads *m* on the other side is situated. Upon the threads *m* a nut *n* is provided, by the screwing down of which nut the clamping-jaws are brought nearer to one another, thereby pressing the joined surfaces of the rails *a* and *b* together.

The highly-heated iron used in this process is obtained in the following manner: A mixture of aluminium and oxid of iron, (the latter chemically as pure as possible) to which mixture sesquioxid of manganese, oxid of chromium, or wolfram-acid may be added, is brought to reaction by means of igniting pellets. After the reaction is completed the contents of the crucible in which the reaction has been carried out consists of a layer of molten alumina floating on the top and underneath this layer highly-heated molten iron. In accordance with this process the molten metal resulting from the reaction should be cast in contact with a metallic part without bringing the molten slag into contact with such part. This may be done by first removing the molten alumina after which the highly-heated iron may be cast between the carefully cleaned welding surfaces which are placed in the proper relation to each other. As soon as the metal is congealed it is put under a certain pressure by screwing the nuts *n* down, so that the metal will gradually cool down under compression. After the mold *c* has now been removed, the joint may still be exposed to a finishing work.

It will be clear that the surfaces to be joined may have any convenient form and that the process can be used for joining any suitable metal.

The direction of the pressure exercised upon the pieces to be welded after the highly-heated metal being cast between the same depends naturally upon the form of the surface to be joined. If, for instance, there are angular surfaces to be welded, then the pressure must be exercised in a diagonal line or in the resultant of two lines being normal to the two angular welding-surfaces.

In Fig. 2 a plate *q* is shown, having an angular cut into which a plate *p* is pressed. The pressure must here be exercised in the direction of the resultant *r* (indicated by the arrow) after the highly-heated metal has been cast between the welding-surfaces of the plates *p* and *q*. The mold is not shown in this figure.

In Fig. 3 another modification of welding is shown for the case of two overlapping surfaces. By welding two rails overlapping each other a large joint-surface is created, so that the durability of the joint is increased.

In the same manner described above defective cast, rolled, or weld iron pieces can be mended. For instance, there is a toothed wheel in which a tooth is broken off. In order to fix a new tooth on the respective place, the mold having a free space corresponding to the shape of the tooth is mounted upon the damaged part by means of molding-sand or the like. Then highly-heated iron, preferably corresponding in its chemical composition to the material of the piece to be welded, is cast into the mold. The metal becomes welded to the wheel, owing to the highly-heated state, in such a manner that the joint is but little or not at all less strong than the piece to be welded. The formation of a good and homogeneous joint between the part or parts to be welded and the superheated metal added by casting can be accelerated either by mechanical compression of the parts to be welded together or by heating such parts or part before the superheated metal is brought into contact with the same. This heating can be obtained by casting upon the ground material the alumina resulting from the reaction of aluminium and oxid of iron and also advantageously by a small coal—especially charcoal—blast-flame. For instance, after having adjusted the rails a certain quantity of charcoal may be placed around the joint and then heated under a downwardly-directed draft, thereby rendering the rail extremities red-hot. Thereafter it is only necessary to remove the charcoal and to clean the welding-surfaces by blowing off the ashes, so that the rails are ready to become welded by casting the metal between the welding-surfaces.

Having thus fully described the nature of by said invention, what I desire to secure by Letters Patent of the United States is—

1. A process of welding which consists in igniting a mixture of a reducible metallic compound and aluminium, and casting the molten metal resulting from the reaction in contact with a metal part without bringing the molten slag into contact with such part.

2. A process for adding metal pieces or filling out hollow spaces by casting, consisting in igniting a mixture of a reducible metal compound with aluminium, removing the alumina resulting from the reaction taking place and then casting the highly-heated metal into the spaces, substantially as described and for the purpose set forth.

3. A process for welding metal pieces, consisting in cleaning the joint-surfaces, placing the pieces in a certain distance to each other, surrounding the ends to be joined with a mold, igniting a mixture of a reducible metal compound and aluminium, removing the alumina resulting from the reaction taking place and casting the highly-heated metal between the joint-surfaces, substantially as described and for the purpose set forth.

4. A process for welding metal pieces, consisting in cleaning the joint-surfaces, placing the pieces in a certain distance to each other, surrounding the ends to be joined with a mold, igniting a mixture of a reducible metal compound and aluminium, removing the alumina resulting from the reaction taking place, casting the highly-heated metal between the joint-surfaces and pressing the pieces together as soon as the metal cast between the same is congealed, substantially as described and for the purpose set forth.

5. A process for welding metal pieces, consisting in cleaning the joint-surfaces, placing the pieces in a certain distance to each other, surrounding the ends to be joined with a mold, heating these ends, igniting the mixture of a reducible metal compound and aluminium, removing the alumina resulting from the reaction taking place, casting the highly-heated metal between the joint-surfaces and pressing the pieces together as soon as the metal cast between the same is congealed, substantially as described and for the purpose set forth.

6. A process of welding which consists in igniting a mixture of a reducible metallic compound and aluminium, and casting the molten metal resulting from the reaction, free of slag, in contact with a metal part.

In testimony whereof I have signed my name to this specification in the presence of two subscribing witnesses.

HANS GOLDSCHMIDT.

Witnesses:
WOLDEMAR HAUPT,
HENRY HASPER.